United States Patent [19]

Namy

[11] 4,157,249

[45] Jun. 5, 1979

[54] SUCTION DEVICE FOR THE WET EXTRACTION OF DUST

[75] Inventor: Gerald Namy, Saint-Etienne, France

[73] Assignee: Creusot-Loire Enterprises, Paris, France

[21] Appl. No.: 898,844

[22] Filed: Apr. 20, 1978

Related U.S. Application Data

[63] Continuation of Ser. No. 744,744, Nov. 24, 1976, abandoned.

[30] Foreign Application Priority Data

Nov. 18, 1975 [FR] France .............................. 75 36616
Nov. 23, 1976 [FR] France .............................. 76 35177

[51] Int. Cl.² ........................................... B01D 47/00
[52] U.S. Cl. ........................................ 55/230; 261/89
[58] Field of Search ...................... 55/230; 261/89, 90

[56] References Cited

U.S. PATENT DOCUMENTS

| 1,408,736 | 3/1922 | Hernu .................................... 55/230 |
| 3,653,187 | 4/1972 | Peterson ................................ 55/230 |

FOREIGN PATENT DOCUMENTS

| 172640 | 3/1952 | Austria ...................................... 55/230 |
| 2416958 | 9/1975 | Fed. Rep. of Germany ............ 55/230 |

*Primary Examiner*—Bernard Nozick
*Attorney, Agent, or Firm*—Haseltine, Lake & Waters

[57] ABSTRACT

A suction device for the wet extraction of dust from dust laden gas comprises a centrifugal rotor housed in a casing and rotatable about an axis, and means for projecting a wetting liquid into the rotor adjacent the gas inlet thereto, the rotor being provided with at least two sets of blades, the blades of each set being uniformly arranged in a crown and forming channels with at least one of the sidechecks of the rotor in which gas flows from the center towards the periphery, the leading and trailing edges respectively of the blades of the first set being located closer to the axis of the runner than the leading and trailing edges respectively of the blades of the second set, the leading edges of the blades of the first set being located near to but angularly spaced from the trailing edges of the blades of the second set.

3 Claims, 11 Drawing Figures

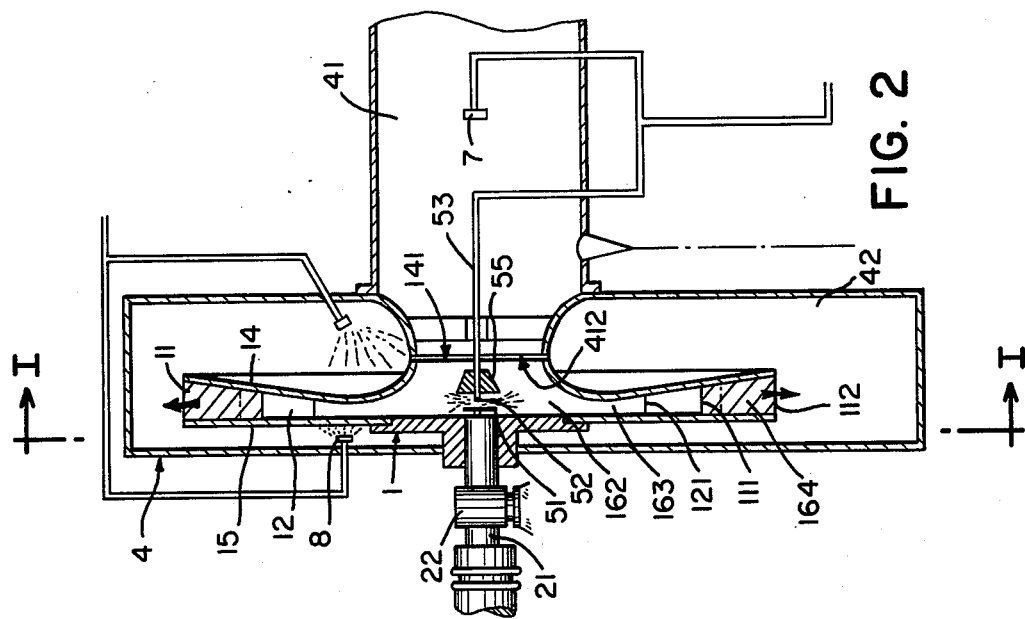
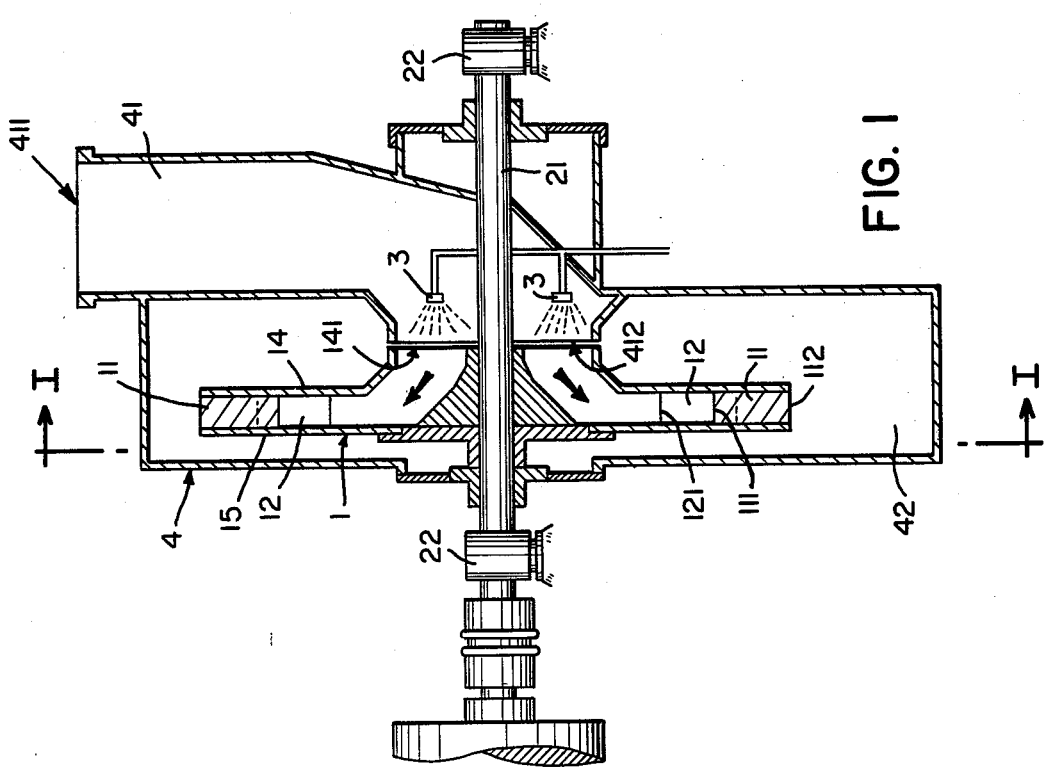

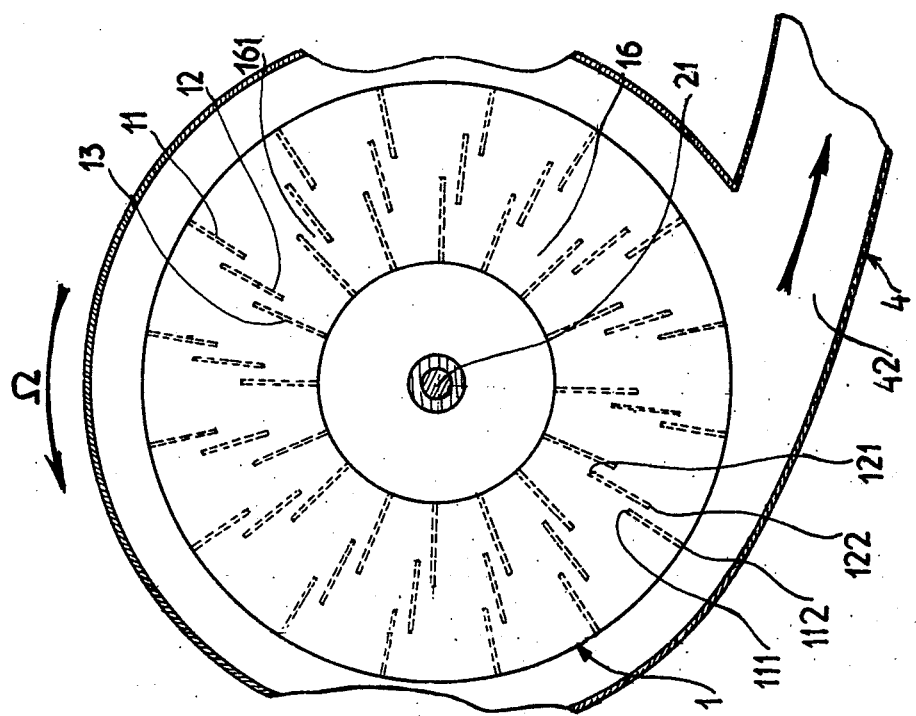
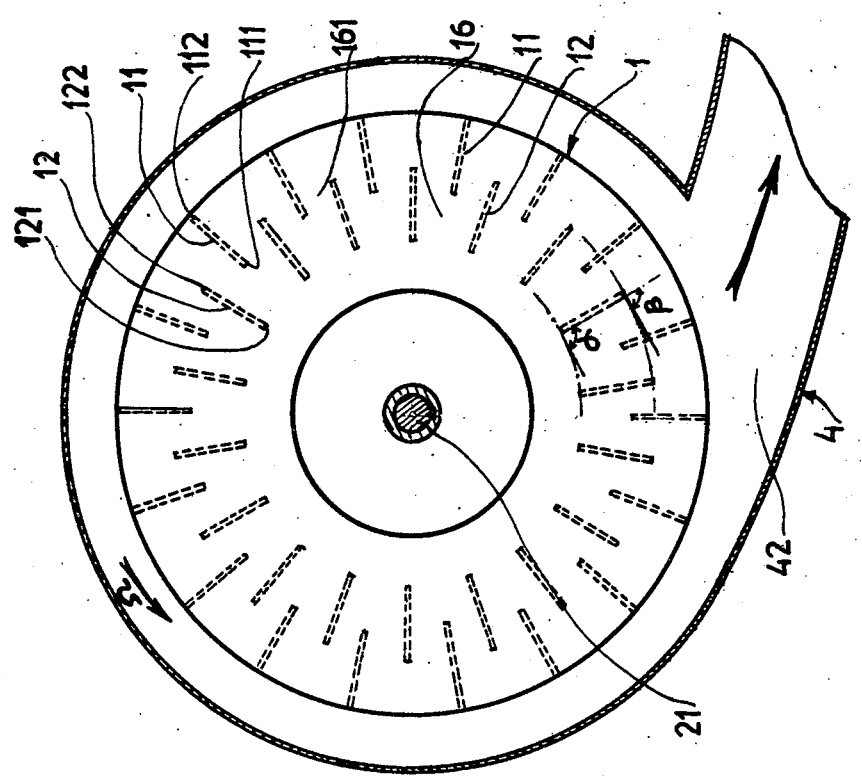

SUCTION DEVICE FOR THE WET EXTRACTION OF DUST

This is a continuation of application Ser. No. 744,744 filed Nov. 24, 1976 now abandoned.

The present invention relates to a suction device for wet extraction of dust from a gas laden with dust.

Various types of hydraulic dust extractors are known which ensure the wetting by a liquid, of the particles contained in the gas to be purified, so that the particles are weighted, agglomerated and recovered. Mixing of the droplets of wetting liquid with the gas to be purified is effected in various ways depending upon the type of dust extractor.

One well known wet type dust extractor is the Venturi washer. In this apparatus the dust-laden gas passes through a convergent-divergent passage. Water injected into the neck of the Venturi or close to the neck is dispersed in the flow of gas. The high speed of the gas favours the agglomeration of the particles of water and dust. A separator, generally of centrifugal type, located downstream of the Venturi ensures collection of the water and the agglomerated particles. A fan is arranged downstream of one or a number of Venturi washers for exhaust of the gas. The efficacy of the apparatus is the higher, the higher the speed in the neck of the Venturi and consequently the load loss is considerable. The fan must overcome this load loss and the rotor of this fan must have a high peripheral speed. The dust particles which have not been eliminated in passing through the Venturi washer or washers have a tendency to stick to the fan rotor. This deposit brings about unbalance which causes vibrations which necessitate stops for cleaning the rotor. Another disadvantage of dust-extraction installations with Venturi washers lies in the high energy consumption.

Another wet type dust extractor which might be called a wet dynamic dust extractor comprises a rotor furnished with blades which resembles a fan rotor. This rotor revolves in a casing similar to a fan volute. The gas to be purified is admitted to the suction opening of the casing. Into this opening water for wetting is atomized in order to wet the blades of the rotor. It is upon passing over the blades of the rotor that the gas is relieved of the greater proportion of its dust. By the mixing due to the fan the dust particles come into contact with the water droplets. These droplets escape from the blades before being collected by the inner wall of the casing. The gases are thus compelled to pass through numerous curtains of water droplets by which purification is effected.

Wet dynamic dust extractors play at one and the same time the part of fan and dust extractor. The load loss is less than the load loss with Venturi washer installations but the fan output is less than that of a good fan. One example of this type of apparatus is described in French Pat. No. 773 321. Another example is the Theisen or Dingler disintegrator well known to ironworks. These disintegrators are described, for example, in French Pat. No. 1 009 565 or in German Pat. No. 472 182. Known dynamic dust extractors have restricted application either because of their limited efficacy or because of the limited increase in pressure which they can provide.

In a preferred embodiment of the invention, each trailing edge of a blade of the first set is located a distance from the axis of the rotor greater than the distance of the leading edge of a blade of the second set from the axis of the rotor so as to form staggered openings between the channels defined by the sets of blades.

The device may include an impact plate arranged facing the outlet of at least one nozzle for injection of wetting liquid under high pressure which is to be atomized upon contact with the plate to form a sheet of liquid droplets.

The width of the path of flow of gas in the rotor along a plane passing through the axis of revolution advantageously diminishes starting from the inlet of gas to the rotor, passes through a minimum and then increases to the periphery of the rotor so that the cross-section of the path of flow of gas exhibits a constriction.

The invention will now be described in greater detail by reference to embodiments thereof, given by way of example only, and illustrated in the accompanying drawings.

In the drawings:

FIG. 1 is an axial section through an embodiment of a device in accordance with the invention;

FIG. 2 is an axial section of a second embodiment of a device in accordance with the invention.

FIGS. 5 to 10 are sections along the line 1—I in FIGS. 1 to 4 respectively; and

Figure 3:
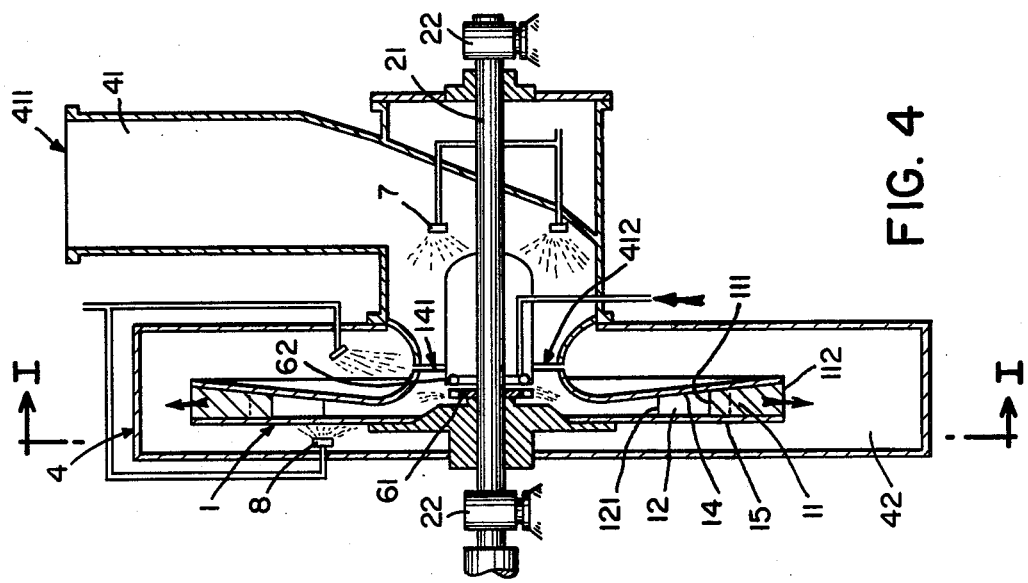
FIG. 3 is an axial section of a third embodiment of a device in accordance with the invention.

The devices illustrated in FIGS. 1 to 11 each includes a runner or rotor 1 which is similar to a fan rotor. This rotor is integral or fast with a shaft 21 which is coaxial with the axis of revolution of the rotor and which is guided and supported by bearings 22. The shaft is driven in rotation by a motor which is not shown. The rotor 1 is enclosed in a casing 4 similar to a fan volute. This volute includes a suction duct 41 through which the gas to be freed of dust is sucked. The volute also includes a delivery duct 42 through which the gas propelled by the rotor leaves. The suction duct 41 forms an opening 411 on the outside and forms on the other hand inside the casing an opening 412 which is circular and concentric with the axis of revolution. The gas to be freed of dust enters the rotor 1 through the opening 412.

The rotor 1 includes at the centre an inlet opening 141 located face to face with the opening 412. In the rotor the gas to be freed of dust flows radially from the inlet opening 141 at the centre towards the periphery. The rotor is constructed with a sidecheek 14 forming the inlet and with a sidecheek 15 located at the rear. The rotor is equipped between the sidecheeks with a set of radial blades 11 of short span arranged uniformly in a crown at equal distances from the axis of revolution. The rotor is equipped with another set of radial blades 12 of short span, also arranged in a crown at equal distances from the axis of revolution. The blades 11 and 12 form with the sidecheeks radial channels 16 in which the gas to be freed of dust flows radially. The blades 11 and 12 are arranged so that the leading edges 121 of the blades 12 are located nearer the axis of rotation of the rotor than the leading edges 111 of the blades 11 and that the trailing edges 122 of the blades 12 are located nearer the axis of rotation 2 than the trailing edges 112 of the blades 11.

Furthermore each trailing edge 122 of a blade 12 of the inner crown is located near to the leading edge 111 of an immediately adjacent blade 11 of the outer crown so as to leave a passage, an opening 161 providing communication between two channels 16. Each of the blades extend radially over a length less than the distance between the hub of the rotor and the periphery of the rotor so as to form the openings 161 between them.

The opposite ends of two adjacent blades are offset. Thus each trailing edge 122 of a blade 12 of the inner crown is offset angularly with respect to the leading edge 111 of an adjacent blade 11 of the outer crown. Thus the blade 12 of the inner crown is located in front of the adjacent blade 11 of the outer crown if one is looking in the direction of rotation.

Each trailing edge 122 of the blades 12 of the inner crown is located with respect to the axis of revolution at a distance greater than the distance with respect to the same axis, of each leading edge 111 of the blades 11 of the outer crown. In this way the trailing portion of each blade 12 of the inner crown is imbricated between the leading portions of two blades 11 of the outer crown. Each blade 11 of the inner crown thus forms with the outer blade located immediately behind it a staggered opening 161.

Into the stream of gas flows through the channels 16 defined by the blades with an impact effect at each blade end.

The rotor may as described above include two sets of blades arranged in crowns each set at a constant distance from the axis of the rotor as in FIG. 5. It may also include more than two sets of blades arranged in crowns, each set at a constant distance from the axis of the rotor. Thus in FIG. 6 the runner includes three sets of blades 11, 12 and 13.

In the embodiments of FIG. 5 and 6 the blades are arranged radially and are linear. The angles α and β respectively formed by each blade with a tangent to the circle circumscribing the leading edges and with a tangent to the circle circumscribing the trailing edges, are equal to 90°.

In the embodiments of FIG. 5 the angular gaps formed between each blade of one crown and the two adjacent blades of the next crown are equal. In the embodiment of FIG. 6, on the contrary, each blade 12 of the intermediate crown is angularly nearer to the blade 11 of the outer crown, which is adjacent the rear of the blade 12, than to the blade 11 of the same crown which is located adjacent the front of the blade 12.

Figure 7:
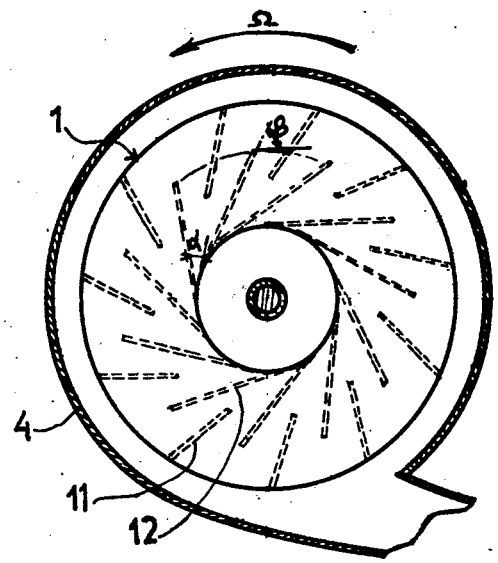
Figure 8:
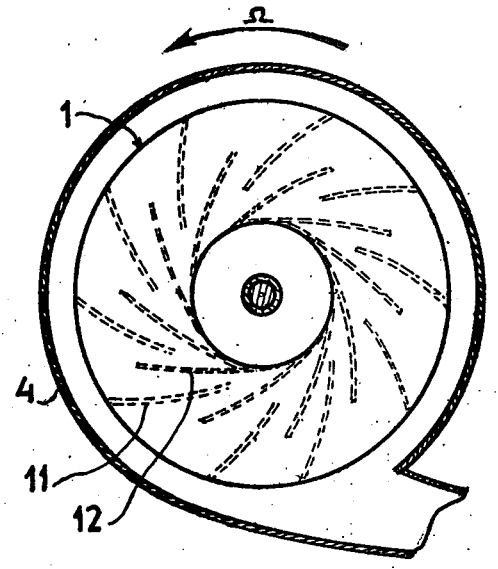
Figure 9:
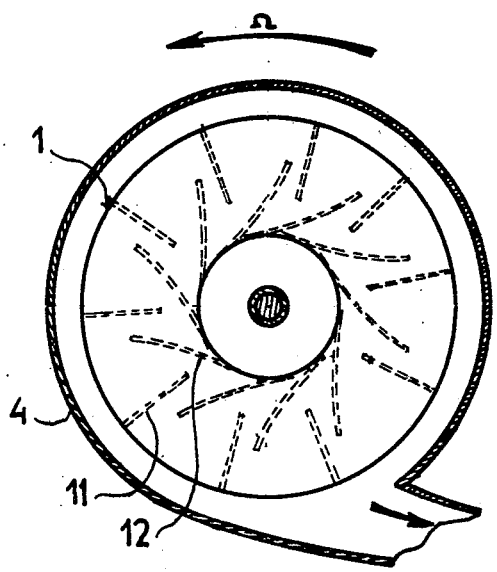
Figure 10:
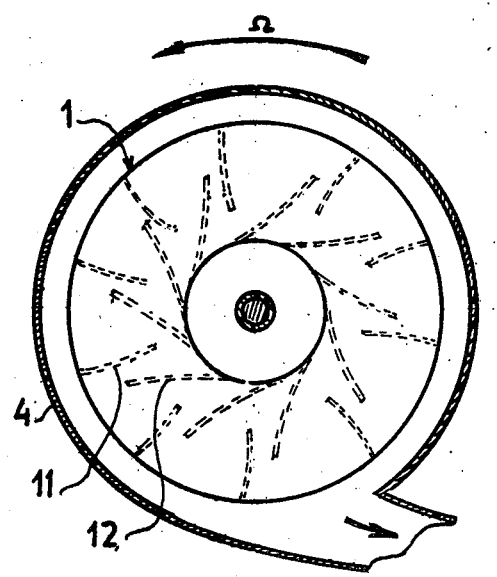

In the embodiments of FIGS. 7 to 10 the angles α and β differ from 90°, the blades being orientated towards the rear with respect to the radii. In the embodiment of FIG. 7 the blades are linear. In the embodiments of FIGS. 8 to 10 the blades are wholly or in part curved.

Injection of a wetting liquid such as water into the gas stream and into the casing is provided. This injection takes place near the opening 141. The water is injected into the stream of gas in the form of droplets. The impact effect produced at each disengagement between one blade such as 11 and the next blade 12 contribute to the mixing of the gas and water and consequently to the wetting of the dust particles contained in the gas.

The droplets of water which escape from the rotor are flung against the inner wall of the volute and the gases are compelled to pass through numerous curtains of water. The water from wetting is recovered downstream. Drying of the gas may be obtained by a conventional separator. The water from wetting may also be recovered directly by a blowdown located in the exhaust dust.

Injection of the wetting liquid may be carried out by various atomization devices. In the embodiment of FIG. 1 injection of water under pressure is effected by one or a plurality of atomizers 3 which produce a very fine atomization of the water equally distributed over the whole of the plane of suction of the opening 141.

In the embodiment of FIG. 2 the formation of water droplets is obtained by an impact plate 51 which is arranged facing the outlet of a nozzle 52 for injection of a wetting liquid such as water under pressure. The nozzle 52 is fed by a pipe 53 held by a support in the duct 41 by which gas to be purified is brought into the casing.

The impact plate 51 is integral or fast with the rotor. The shaft 21 of the rotor is supported in cantilever so that the impact plate 51 which is circular is located at the centre of the running and that the axis of the nozzle 52 is arranged along the axis of the rotor. The pipe 53 extending the nozzle passes through the inlet opening 141 of the rotor, which is defined by the sidecheek 14.

The impact plate 51 is arranged perpendicular to the axis of the rotor, the nozzle 52 and of the jet under pressure. This plate is made of a hard or surface-hardened material. The jet under pressure upon meeting the plate 51 is atomized and forms a sheet of droplets of small dimensions with high kinetic energy and well distributed. The atomization sheet is practically plane and its outline is circular and centred at the intersection between the axis of the nozzle and the impact plate 51.

The impact plate 51 is positioned along the axis of the rotor so that the sheet of droplets is oriented substantially parallel to the direction of flow of the gas into the rotor. The sheet, which is planar, extends between the sidecheeks 14 and 15, the plane of the impact plate 51 itself extending between the side-cheeks 14 and 15.

The impact plate 51 might be slightly concave or slightly convex in order to obtain a slightly conical atomization sheet. The distance between the nozzle 52 and the plate 51 may be adjusted. A profiled deflector 55 is arranged in front of the nozzle.

Figure 4:
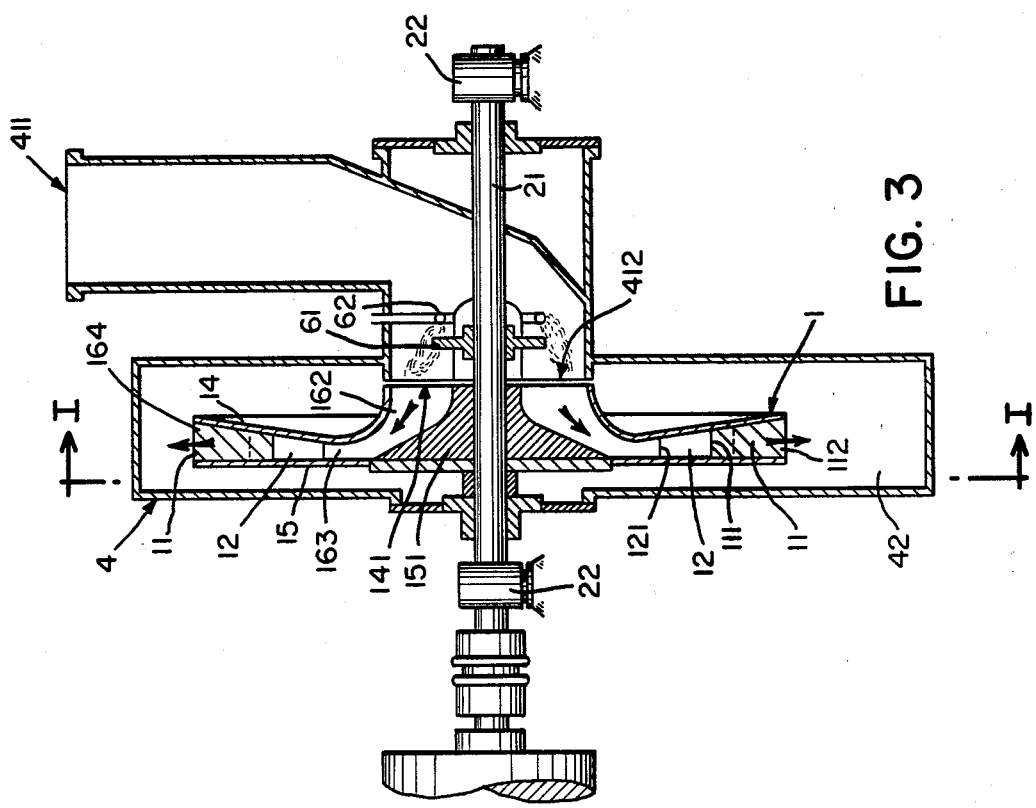
FIG. 4 is an axial section of a modification of the embodiment as FIG. 3.

In the embodiments of FIGS. 3 and 4 the formation of the water droplets is obtained by an impact plate 61 which is arranged facing the outlets from nozzles 62 for injection of a wetting liquid under pressure.

The impact plate is integral or fast with the rotor. The shaft 21 passes through the rotor and the impact plate 61 has the shape of a crown which surrounds the shaft. The nozzles 62 are arranged to the side with respect to the shaft 21 and to the axis of the rotor.

The impact plate 61 is arranged perpendicular to the axis of the rotor. It is made of a hard or surface-hardened material. The jets under pressure upon meeting the plate 61 are atomized.

In the embodiment of FIG. 3 the plate 61 is located upstream of the rotor 1 and the atomization sheet is formed upstream of the inlet opening 141 of the rotor. A profiled hub 151 may be provided on the rotor. The atomization sheet is substantially perpendicular to the direction of flow of the gas.

In the embodiment of FIG. 4 the impact plate 61 is arranged downstream of the inlet opening 141 of the rotor. The nozzles 62 are themselves located downstream of the inlet opening that is to say, within the rotor. The atomization sheet may then be substantially parallel with the direction of flow of the gas.

The liquid droplets in the atomization sheets have a high kinetic energy which favours the wetting of the solid particles and favours the flow of the gas.

The impact plate instead of being mounted on the rotor may be fixed to the casing, e.g. in the suction duct 41. It preferably has the shape of a crown, the atomization nozzles being arranged face to face with the crown.

The plate 61 may be equipped with knives. Auxiliary atomizers 7 may be arranged downstream of the main atomization means. Atomizers 8, FIG. 4 may also be provided for washing the sidecheeks of the rotor.

In the rotors the distance between the sidecheeks 14 and 15 measured perpendicular to the velocity vectors of the gas stream varies radially.

In the embodiment of FIG. 1 the distance diminishes starting from the opening 141 formed by the sidecheek 14. It may diminish gradually to the periphery of the rotor or may remain constant over the end of the path of the gas.

In the embodiments of FIGS. 2, 3 and 4 the distance between the two sidecheeks 14 and 15 diminishes starting from the inlet opening 141 formed by the sidecheek 14. It passes through a minimum and then increases to the periphery of the rotor. In this way the cross-section of the path of flow of the gas in each channel exhibits in succession in the direction of flow starting from the inlet opening a convergent portion 162, a constriction or neck 163, and a divergent portion 164 ending at the periphery of the rotor. In these channels the gases, the water droplets and the dust particles are accelerated as in a conventional Venturi. Considerable mixing is produced in the divergent portions of the channels.

In order to achieve the variation in distance and cross-section defined above, at least one of the sidecheeks 14 or 15 is profiled so as to form a surface of revolution which is concave with respect to the plane perpendicular to the axis of the rotor, which passes through the periphery of the sidecheek. Thus in the embodiments illustrated in FIGS. 2, 3 and 4 the sidecheek 14 forms on the outside a surface of revolution which is concave with respect to the plane perpendicular to the axis of the runner and passing through its periphery. This sidecheek forms on the inside, that is to say, the side next the gas and the blades, a convex surface of revolution which is tangential to a plane perpendicular to the axis of the rotor along a circle of contact of diameter less than the outer diameter of the rotor.

Both sidecheeks 14 and 15 may be profiled.

Figure 11:
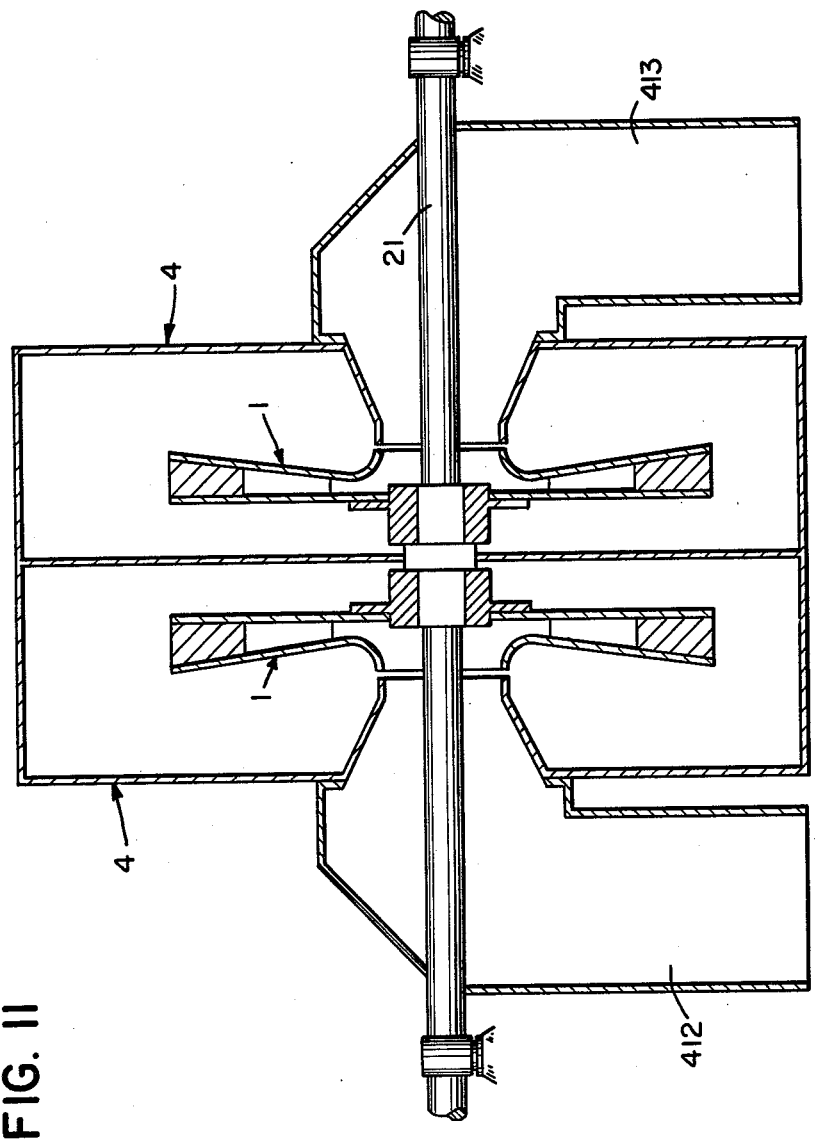
FIG. 11 is an axial section of a two-rotor dust extractor device in accordance with the invention.

The embodiment of FIG. 11 includes two rotor mounted in opposition on a common shaft 21 and revolving in two separate casings. At the output from the first casing the gas enters the second casing through an opening 413 opposite to the inlet opening 412 to the first casing. This series arrangement enables high-efficiency purification. Other arrangements are equally possible.

There is thus provided a dust extractor of wet dynamic type which plays both the part of a fan and the part of dust extractor, in which the mixing of the gas, dust particles and droplets of wetting liquid is improved. In this way the dust extraction capacity is improved with respect to that of known dust extractors and the energy consumption is reduced. The rotor of the dust extractor favours the mixing of the gas and the wetting liquid. The efficacy of the device is improved by the fact that the flow of the gas-wetting liquid mixture is carried out in cascade with repeated impacts against the blades. The flow-pressure characteristic curve of the device displays the special feature of having a continuously negative slope. The advantage of the negative slope is to ensure stable flow under any working conditions and whatever the system in which the device is working whereas with a conventional fan there is a critical zone towards low flows which may appear as a pumping phenomenon. This special feature is of interest if the flow of gas to be freed of dust is variable, which is the case, for example, with collection without combustion in an oxygen converter. The efficacy of the device is improved by atomization of fine liquid droplets of high kinetic energy into the flow of gas. The efficacy is also improved by the particular form of rotor which creates considerable mixing as in a Venturi. The device is capable of providing a considerable increase in pressure and consequently may be adapted to any systems. It enables gases of different natures to be handled over a wide range of flows. A high degree of purification is possible by making a number of devices act in series.

The device is specially suitable for ensuring dust extraction from a steelworks converter. The gas is collected by a hood and passes through a tower for atomization of water, which may be followed by a droplet separator. The gas is then treated by a device as described above.

What is claimed is:

1. A suction apparatus for wet extraction of dust from a gas laden with dust comprising: a fan volute provided with an opening and a delivery duct; a rotor adapted to be driven around an axis of revolution, being provided with a first side cheek and a second side cheek operating to form an inlet opening central thereof disposed in proximity to said opening of said volute and being coaxial with the said axis, at least one of the side cheeks being profiled from said inlet opening to define respectively, a convergent position, a neck portion, a divergent portion, said neck and divergent portions ending at the periphery, said side cheeks increasing in distance from the said neck to the said periphery, and at least two sets of radial blades provided between said side cheeks with the members of each set being arranged at equal distances of said axis to thereby form a first crown and an outer second crown and each trailing edge of said blade of said inner crown being offset angularly with respect to the leading edge of an adjacent blade of the outer crown; and means for introducing wetting liquid into said rotor at a point central thereof.

2. A suction apparatus as claimed in claim 1 having means for introducing wetting liquid being defined by: nozzle means for providing a jet of wetting liquid under high pressure directed parallel to the axis of revolution; an impact plate fastened on said rotor near its axis, arranged substantially perpendicular to the said axis and facing the outlet of said nozzle whereby said jet being atomized upon contact with said impact plate to form a sheet of liquid droplets.

3. A suction apparatus as claimed in claim 2, wherein: said plate is in the form of a crown supported by shaft means fastened to said rotor extending through said rotor, nozzle means being disposed to the side of said shaft.

* * * * *